United States Patent
Herrero

(10) Patent No.: US 10,298,627 B2
(45) Date of Patent: *May 21, 2019

(54) CONCENTRATION OF INDEPENDENT TUNNELED ENCAPSULATED MEDIA

(71) Applicant: Oracle International Corporation, Redwood Shores, CA (US)

(72) Inventor: Rolando Herrero, Derry, NH (US)

(73) Assignee: Oracle International Corporation, Redwood Shores, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/011,931

(22) Filed: Feb. 1, 2016

(65) Prior Publication Data

US 2017/0223063 A1  Aug. 3, 2017

(51) Int. Cl.
*H04L 29/06* (2006.01)
*H04L 12/46* (2006.01)

(52) U.S. Cl.
CPC ...... *H04L 65/1069* (2013.01); *H04L 12/4633* (2013.01); *H04L 12/4641* (2013.01); *H04L 63/0272* (2013.01); *H04L 63/0281* (2013.01); *H04L 63/0428* (2013.01); *H04L 65/105* (2013.01)

(58) Field of Classification Search
CPC ............. H04L 65/1069; H04L 12/4633; H04L 63/0428; H04L 12/4641; H04L 63/0272; H04L 63/0281; H04L 61/2592; H04L 65/105
See application file for complete search history.

(56) References Cited

U.S. PATENT DOCUMENTS

| 6,708,162 B1 * | 3/2004 | Morgan | G06F 17/3048 |
| 7,649,837 B1 * | 1/2010 | Puuskari | H04L 47/15 370/225 |
| 8,776,209 B1 * | 7/2014 | Kumar | H04L 63/0272 380/270 |
| 9,055,139 B1 * | 6/2015 | Devireddy | H04L 65/80 |

(Continued)

OTHER PUBLICATIONS

Boyce, Jim, "Configure IT Quick: Configuring Routing and Remote Access on your Windows 2000 server;" Oct. 24, 2000, http://www.techrepublic.com/article/configure-it-quick-configuring-routing-and-remote-access-on-your-windows-2000-server/.*

(Continued)

*Primary Examiner* — John A Follansbee
*Assistant Examiner* — Lam T Do
(74) *Attorney, Agent, or Firm* — Potomac Law Group, PLLC

(57) ABSTRACT

A system for transmitting encapsulated media over tunnels, in response to a first request from a first application, establishes a first tunnel between a first tunneling client of a user equipment ("UE") and a tunneling server and establishes a first outer transport layer and a first outer network layer and establishes a local tunneling proxy. Further, the system, in response to a second request from a second application, establishes a second tunnel between the first tunneling client and the tunneling server, where the second request includes a request to use the first outer transport layer and the first outer network layer established in conjunction with the first tunnel, and the second request is forwarded to the tunneling server via the local tunneling proxy.

20 Claims, 6 Drawing Sheets

(56) References Cited

U.S. PATENT DOCUMENTS

| | | | |
|---|---|---|---|
| 2004/0032865 A1* | 2/2004 | Kwon | H04L 29/12018 370/367 |
| 2005/0198306 A1* | 9/2005 | Palojarvi | H04L 63/0272 709/227 |
| 2008/0080508 A1* | 4/2008 | Das | H04L 12/4633 370/392 |
| 2011/0066703 A1* | 3/2011 | Kaplan | H04L 65/4084 709/219 |
| 2011/0153793 A1* | 6/2011 | Tan | H04L 63/0272 709/222 |
| 2011/0202610 A1* | 8/2011 | Chaturvedi | H04L 29/12528 709/206 |
| 2011/0274042 A1* | 11/2011 | Diachina | H04W 28/06 370/328 |
| 2012/0264397 A1* | 10/2012 | Meredith | H04W 76/10 455/410 |
| 2013/0238759 A1* | 9/2013 | Ostrowski | H04L 67/2814 709/219 |
| 2013/0283037 A1 | 10/2013 | Katz et al. | |
| 2014/0241247 A1* | 8/2014 | Kempf | H04L 12/4633 370/328 |
| 2014/0379931 A1 | 12/2014 | Gaviria | |
| 2015/0039687 A1 | 2/2015 | Waxman et al. | |

OTHER PUBLICATIONS

Branko "Bypassing corporate firewall with reverse ssh port forwarding;" Jan. 18, 2009, https://toic.org/blog/2009/reverse-ssh-port-forwarding/.*

Ybanez, Alvin, "How to Use PC Internet Connection with Your Android Phone;" Jan. 15, 2012, http://www.androidauthority.com/how-to-use-pc-internet-connection-with-android-phone-44230/.*

Maples, Wayne, "Internet Connection Sharing with Windows 2000 Professional acts a proxy server;" Mar. 7, 2005, http://www.windowsnetworking.com/kbase/WindowsTips/WindowsXP/UserTips/NetworkandSecurity/InternetConnectionSharingwithWindows2000Professionalactsaproxyserver.html.*

Netgear, "NETGEAR ProSafe VPN Client User Manual;" Apr. 2012, http://www.downloads.netgear.com/files/GDC/VPNG01L/usermanual.pdf.*

H. Schulzrinne et al.; "RTP: A Transport Protocol for Real-Time Applications";Jul. 2003; 89 pages.

3rd Generation Partnership Project; Technical Specification Group Services and System Aspects; Study on firewall traversal (Stage 2) (Release 12); 3GPP TR 33.830 V0. 5.0 (Nov. 2013).

* cited by examiner

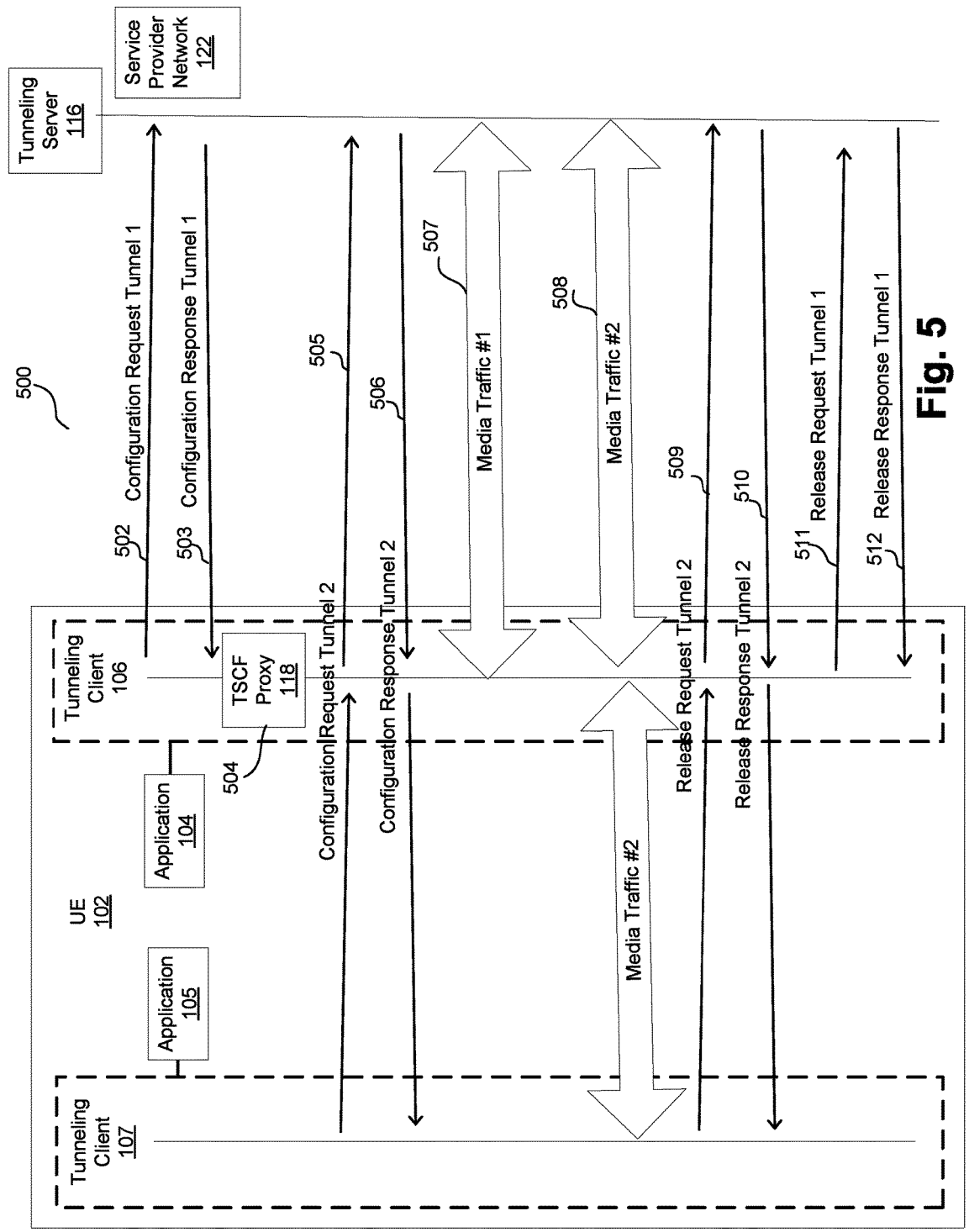

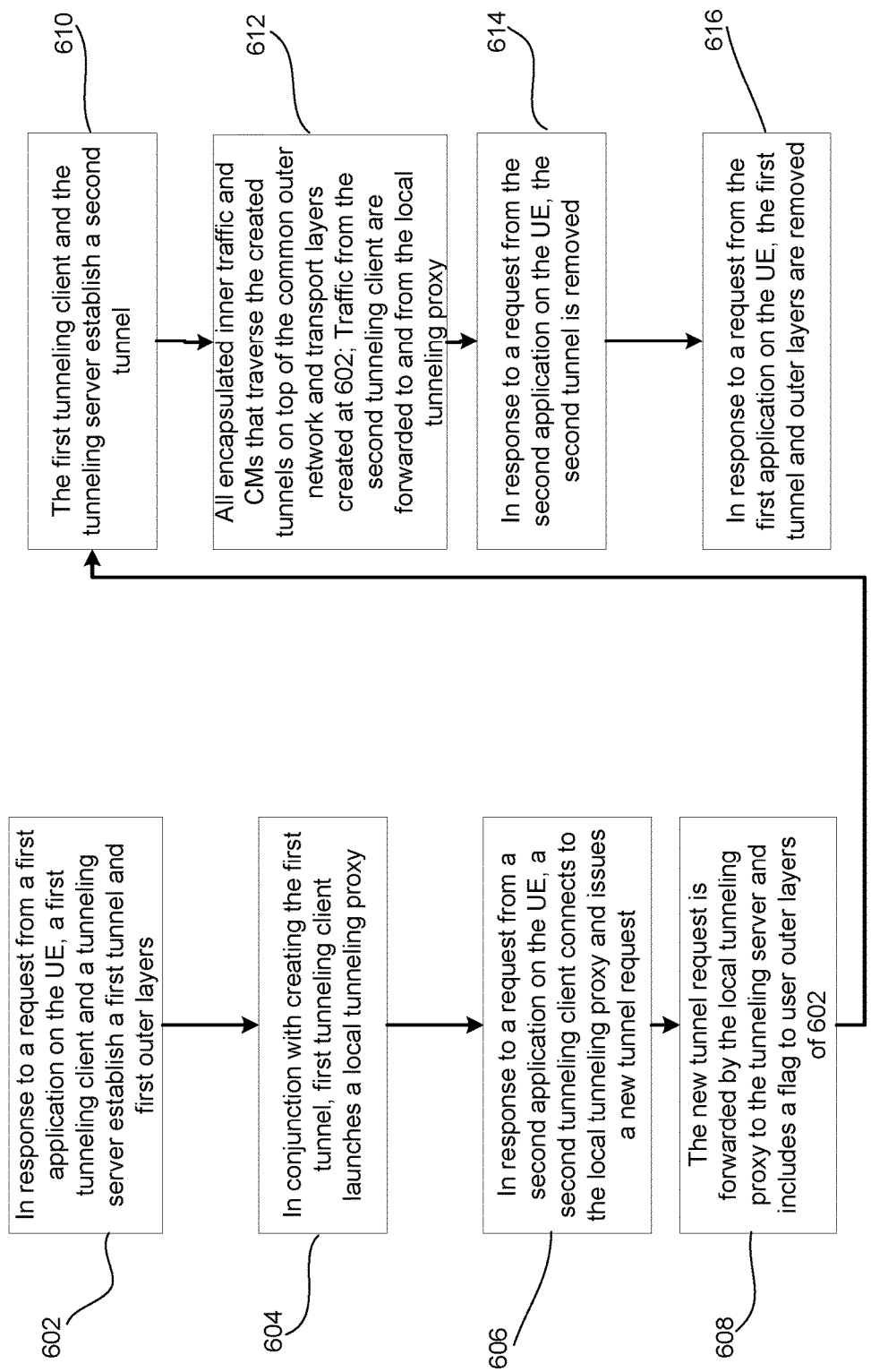

CONCENTRATION OF INDEPENDENT TUNNELED ENCAPSULATED MEDIA

FIELD

One embodiment is directed generally to a communications network, and in particular, to the transmission of encapsulated media within tunnels over a communications network.

BACKGROUND INFORMATION

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a system for transmitting encapsulated media over tunnels. The system, in response to a first request from a first application, establishes a first tunnel between a first tunneling client of a user equipment ("UE") and a tunneling server and establishes a first outer transport layer and a first outer network layer and establishes a local tunneling proxy. Further, the system, in response to a second request from a second application, establishes a second tunnel between the first tunneling client and the tunneling server, where the second request includes a request to use the first outer transport layer and the first outer network layer established in conjunction with the first tunnel, and the second request is forwarded to the tunneling server via the local tunneling proxy.

BRIEF DESCRIPTION OF THE DRAWINGS

FIG. 5 is an example message sequence diagram, including the sequence of messages exchanged between a tunneling client and a tunneling server, for concentrating independent traffic using common outer layers via a proxy according to some embodiments.

FIG. 6 is a flow diagram of a proxy tunneling server module of FIG. 2 and/or a tunneling client and tunneling server of FIG. 1 concentration of independent tunneled traffic using a local tunneling proxy in accordance with embodiments of the present invention.

DETAILED DESCRIPTION

One embodiment allows multiple applications on a user equipment ("UE") device to use the same tunnel outer layers to communicate with a tunnel server by using an intermediate proxy tunnel server within the UE, and co-transported tunnels. The intermediate proxy tunnel server receives tunnel traffic from multiple applications within the UE and concentrates the independent tunnel traffic through a single tunnel outer transport layer and network layer connection to the tunnel server.

Figure 1:
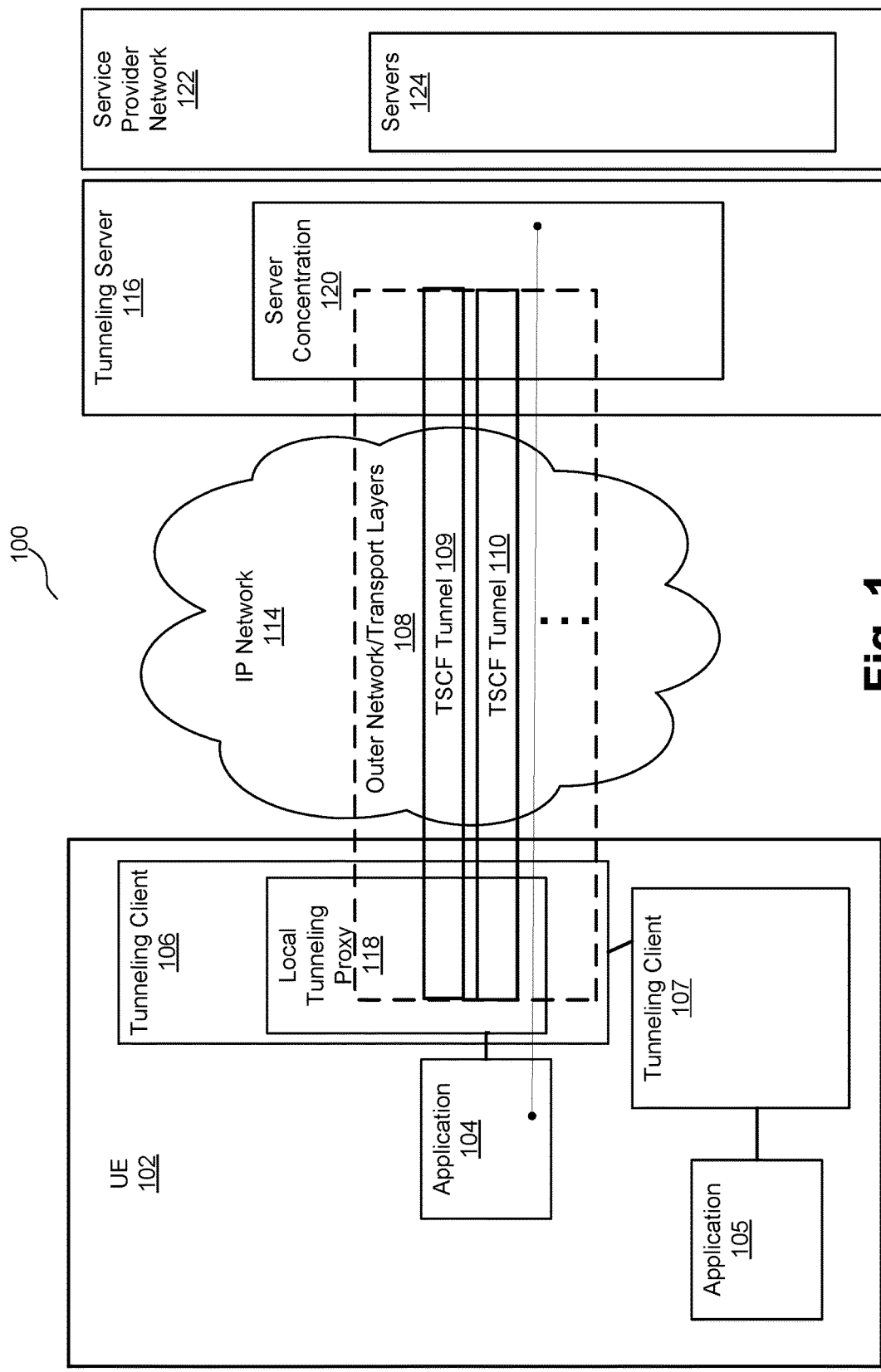
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs real-time communications ("RTC") over an Internet Protocol ("IP") network 114 with a service provider network/backbone 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC") 793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing one or more tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish one or more TSCF tunnels 109, 110 . . . that are compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnels 109, 110 between tunneling client 106 and tunneling server 116. Further, common outer network/transport layers 108, disclosed in more detail below, provide outer network/transport layers for tunnels 109, 110 and all other TSCF tunnels spanning tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnels 109, 110 such that UE 102 may use it to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message ("CM") header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV_Count" field indicating the number of TLVs that follow or are appended to the header in the corresponding control message, a "Tunnel Session ID" ("TSID") field including a tunnel session identifier ("ID") assigned by tunneling server 116 to uniquely identify each TSCF tunnel 109, 110, and a "Sequence" field that is incremented per message, as described in, for example, 3GPP TR 33.830 V0.5.0.

In one embodiment, in order to establish TSCF tunnels 109, 110, tunneling client 106 sends a "configuration request" message to tunneling server 116 to obtain configuration information for TSCF tunnels 109, 110. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to each TSCF tunnel. The subsequent messages between tunneling client 106 and tunneling server 116 include this assigned TSID in their headers that corresponds to the desired traversal tunnel.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, the TSCF tunnel is terminated.

In one embodiment, UE 102 executes multiple different independent applications 104, 105. etc. For example, UE 102 may be a smartphone, and one application may be an online chat application, an another application may be a voice/video telephone call application, and each application may be directing tunneled traffic to the same server (i.e., tunneling server 116). Each application 104, 105 may be a SIP-based RTC application relying on a library such as the software development kit ("SDK") provided by the Tunneled Session Management ("TSM") solution from Oracle Corp. The TSM solution employs a client/server architecture using session border controllers ("SBCs") and client applications, such as application 104, that may be developed using the SDK. The client applications initiate secure communications sessions with the service provider over the Internet. The session border controllers (e.g., implemented by tunneling server 116) at the edge of the network terminate and control the tunnels before passing the secure traffic into the service core of service provider network 122. In one embodiment, SDKs are implemented by a local tunneling proxy 118 and/or a server concentration module 120. The SDKs in general provide additional APIs beyond "standard" TSCF APIs in order to implement the functionality disclosed herein.

In one embodiment, each application 104, 105 executed by UE 102 has a corresponding tunneling client 106, 107, respectively. One of the tunneling clients (i.e., tunneling client 106) is considered the primary tunneling client and is responsible for establishing tunnels 109, 110, and outer network and transport layers 108, and transmitting and receiving data from tunnels 109, 110, using the same outer layers 108. The primary tunneling client 106 includes local tunneling proxy 118. The remaining tunneling clients on UE 102 (i.e., tunneling client 107 or additional tunneling clients if there are additional independent applications on UE 102) use the same outer layers 108 through local tunneling proxy 118.

Figure 2:
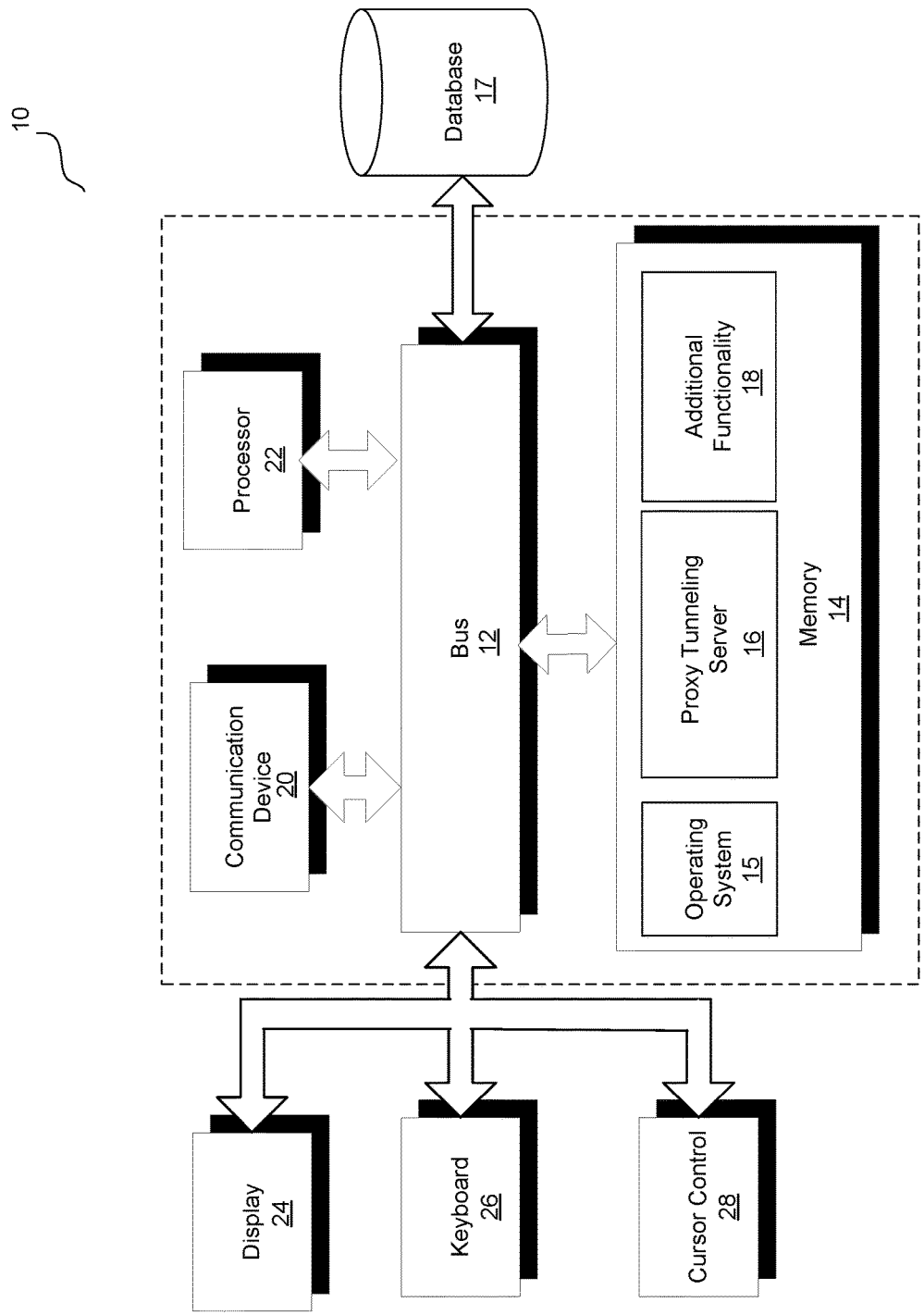
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include proxy tunneling server module 16 for concentrating independent data from multiple applications into a single outer layer of TSCF tunnels, and functioning as a proxy tunneling server for applications, and all other functionality disclosed herein. In one example embodiment, proxy tunneling server module 16 may implement tunneling server 116 of FIG. 1 in conjunction with one or more remaining elements of FIG. 2. System 10 can be part of a larger system, such as added functionality to the "Acme Packet 6300" session border controller from Oracle Corp. Therefore, system 10 can include one or more additional functional modules 18 to include the additional functionality. A database 17 is coupled to bus 12 to provide centralized storage for proxy tunnel server module 16 and additional functional modules 18.

Figure 3:
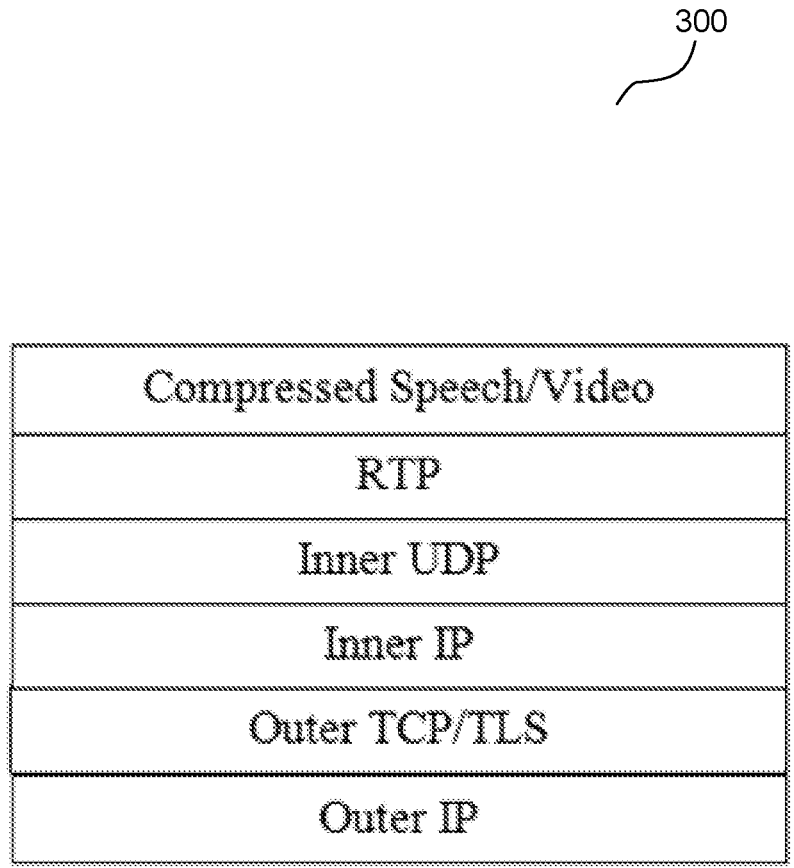
FIG. 3 illustrates example protocol layers in a Tunneled Services Control Function tunneling configuration for encapsulating media traffic according to an embodiment.

In a tunneling configuration, encapsulated (i.e., in a packet/frame) media is typically communicated according to the real-time transport protocol ("RTP" as provided, for example, in IETF RFC 3550). In a TSCF tunneling configuration, RTC (e.g., speech, video, etc.) may be subject to two levels of transport: one at the outer tunnel layer typically according to TCP/TLS, and another at the inner tunnel layer typically according to UDP. FIG. 3 illustrates example protocol layers in a TSCF tunneling configuration 300 for encapsulating media traffic according to an embodiment. In TSCF tunneling configuration 300, compressed media (e.g., speech, video, etc.) is communicated according to RTP at the application layer, and is transported via an inner UDP at the inner transport layer within an inner IP at the inner network layer. The inner layers are within an outer TCP/TLS at the outer transport layer which is in turn within an outer IP at the outer network layer. In one embodiment, since most IP networks block any outer traffic that is not stream-based, TCP/TLS is used at the outer transport layer of TSCF tunnel 108 to guarantee delivery. In embodiments of the present invention, outer layers 108 of FIG. 1 function as the outer transport layer of all TSCF tunnels spanning tunneling client 106 and tunneling server 116 as disclosed in more detail below.

Referring again to FIG. 1, with known systems, tunnels created by multiple applications (e.g., applications 104, 105) that are connected to a common tunneling server (e.g., tunneling server 116) are not typically aware of each other, which can result in excessive consumption of the available resources at the tunneling server. In contrast, embodiments minimize this consumption by having applications 104, 105 connect to intermediate local tunneling proxy 118 that concentrates all traffic through a single tunnel connection transport of outer layer 108 to tunneling server 116 instead of a direct connection. Embodiments are directed to a transparent and automatic mechanism that gives tunnel proxy capabilities to the application that first creates the main tunnel outer layers such that all subsequent applications running on the same system internally use the main tunnel outer layers 108 to communicate with the tunnel server.

In one embodiment, when the concentrated proxy based functionality is configured by an application, if its associated tunneling client (e.g., tunneling client 107) requests a tunnel, it must first try to connect to local tunneling proxy 118 before connecting to the external tunneling server 116. If connecting to local tunneling proxy 118 is not possible (i.e., it has not yet been established), the tunneling client must connect directly to the external tunneling server 116 and also start a local tunneling proxy 118. On the other hand, if connecting to the local tunneling proxy 118 is possible, the outer network and transport are terminated locally and all TSCF traffic is sent to and received from the external tunneling server 116.

In one embodiment, local tunneling proxy 118 runs locally using a well-known transport port such that its presence can be detected by attempting to connect to it. Local tunneling proxy 118 propagates all TSCF traffic, including tunnel control messages, though single transport tunnel layers 108 connected to external tunneling server 116 by means of co-transported tunnels 109, 110.

In one embodiment, the software interface SDK on UE 102 is updated to allow applications 104, 105 to configure and implement the concentration local proxy functionality disclosed herein. Specifically, functionality is included to indicate whether it is enabled and optionally what the network address and transport port of the local tunneling proxy 118 is. Since tunneling clients 106, 107 connected to local tunneling proxy 118 rely on the tunnel transport of the initial client 106 (i.e., layers 108 of tunnel 109), this tunnel (i.e., tunnel 109) cannot be removed in one embodiment until all dependent clients are removed first.

Frequently, as shown in FIG. 1, multiple independent applications require multiple TSCF tunnels to tunneling server 116, each requiring a separate IP address and port. However, the availability of transport ports and resources needed for encryption limit the maximum number of tunnels that can be used in load applications (i.e., an application that generates a large amount of traffic (e.g., thousands of tunnels) such as a traffic testing tool). Known solutions incorporate multiple network interfaces connected to the same network, thus increasing the number of available transport ports but also introducing expensive network topology changes and upgrades.

Figure 4A:
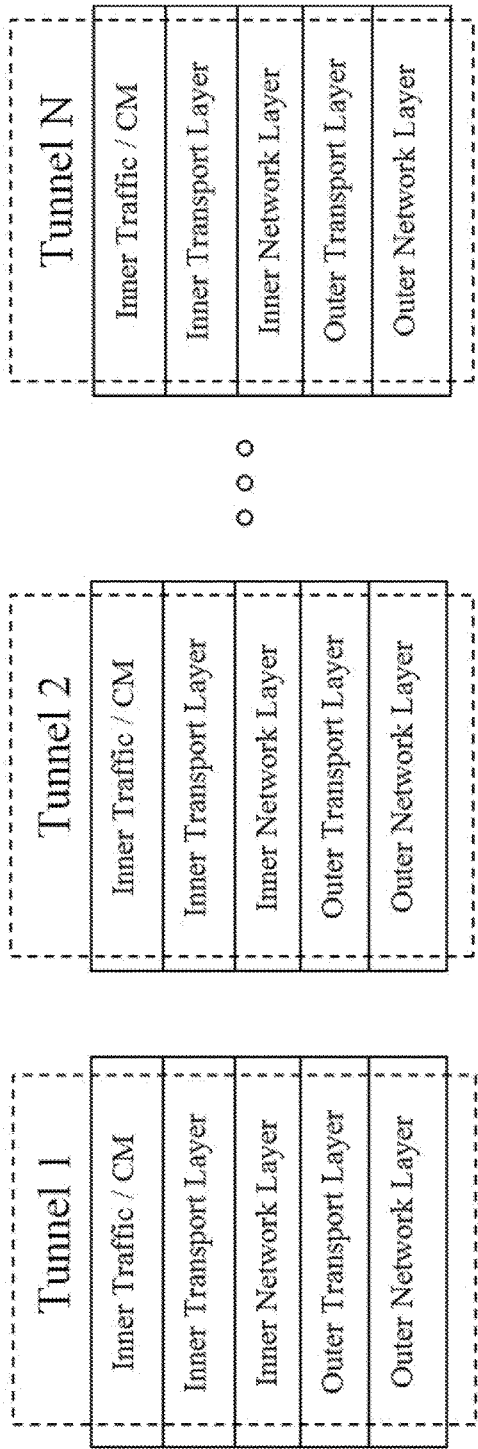
FIG. 4A illustrates a typical prior art tunnel transport scenario.

Applications that require multiple tunnels simultaneously transmitting and receiving traffic are limited by two factors: (1) the number of transport ports available for transmission at the client environment, namely the operating system of UE 102; and (2) the available transport and encryption resources needed to allocate incoming tunnels at tunneling server 116. FIG. 4A illustrates a typical prior art tunnel transport scenario. In FIG. 4A, if N tunnels are in use in a single application, each individual tunnel relies on both a set of outer network/transport layers and another set of inner network/transport layers. Typically these tunnel sessions communicate with a single tunnel server (e.g., tunneling server 116 of FIG. 1) in such a way that the outer layers are redundant.

Figure 4B:
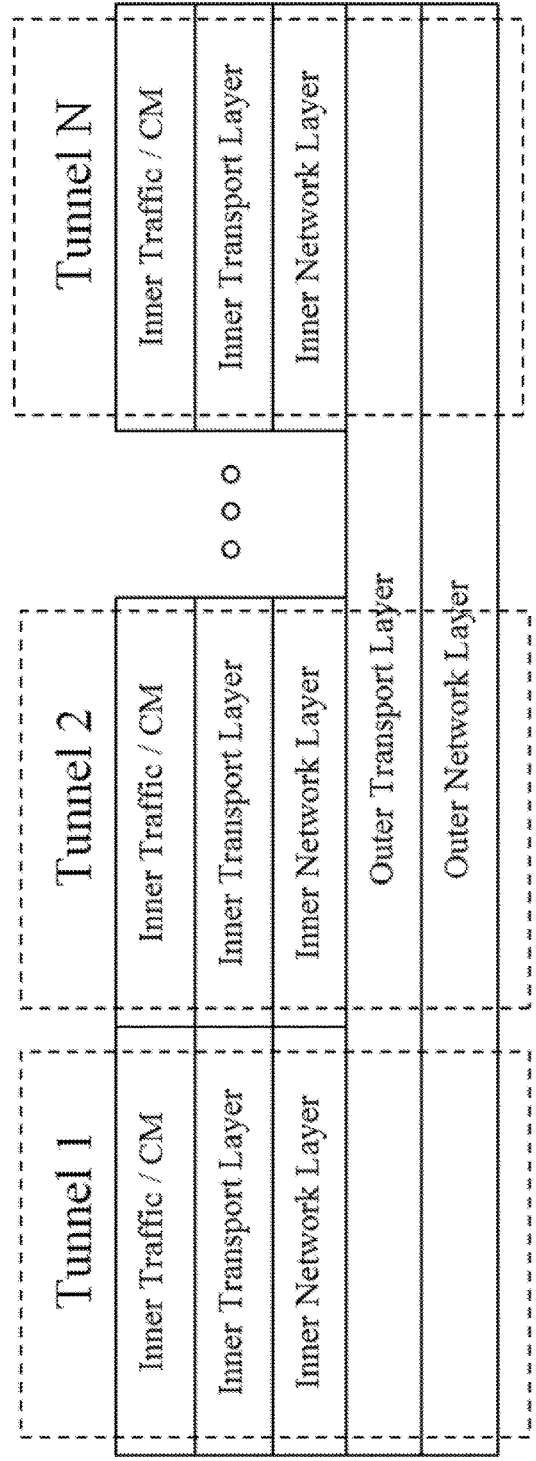
FIG. 4B illustrates a tunnel transport scenario in accordance with embodiments of the invention in which only a single outer transport/network layer is used.

In contrast, embodiments allow for multiple tunnels to rely on a single outer transport layer as opposed to many, which allows the above limits to be avoided and tunnel density to be significantly increased. Embodiments establish co-transported tunnels in order to achieve these results. FIG. 4B illustrates a tunnel transport scenario in accordance with embodiments of the invention in which only a single outer transport/network layer is used. The outer transport layers in both FIGS. 4A and 4B generally include security mechanisms based on the Secure Sockets Layer ("SSL"). Therefore, embodiments reuse the security, transport and network layers of already existing tunnels in order to minimize the use of resources without affecting the transport port availability. Specifically, for multiple TSCF tunnels, only a single IP address and port at server 116 is required with embodiments of the invention, as opposed to an IP address and port for each tunnel.

In one embodiment, local tunneling proxy module 118 (i.e., a software interface SDK) of FIG. 1 is updated to include a flag or other indicator that enables the creation of co-transported tunnels. If a co-transported tunnel is to be created, a main independent and already existing tunnel is assigned to it beforehand. Upon creation, if no main tunnel is available, a regular independent tunnel is negotiated.

In one embodiment, tunneling client 106 transmits all CM headers and encapsulates inner traffic on top of the transport layer of the main tunnel transport. Tunneling server 116 bi-directionally maps, using the inner IP address, the co-transported tunnel transport to the main tunnel transport. From the point of view of applications 104, 105, with the exception of the creation flag, the co-transported tunnels are generally indistinguishable from regular independent tunnels.

FIG. 5 is an example message sequence diagram 500, including the sequence of messages exchanged between tunneling client 106, tunneling client 107 and tunneling server 116, for concentrating independent traffic using common outer layers via a proxy according to some embodiments. FIG. 5 includes network elements such as tunneling client 106 in communication with application 104, and tunneling server 116 in communication with service provider network 122, as described herein with reference to FIG. 1.

Initially, a first application (i.e., application 104) in UE 102 that includes two or more independent applications attempts to create a tunnel. Tunneling client 106 internally attempts to connect to a preconfigured tunnel proxy 118 and when it fails (since it is not running) it creates a new tunnel to the server. Therefore, at 502, tunneling client 106 sends a configuration request message to tunneling server 116 to establish TSCF tunnel 109 (i.e., Tunnel 1), including outer layers 108, which includes an outer network layer as well as a transport layer. At 503, tunneling server 116 responds to the configuration request message of tunneling client 106 with a configuration response message. Configuration request and response messages allow for tunneling client 106 to obtain configuration information for TSCF tunnel 109 from tunneling server 116, as described in, for example, 3GPP TR 33.830 V0.5.0. In one embodiment, from the application perspective, application 104 at UE 102 creates TSCF tunnel 109 by executing a "tsc_ctrl_new_tunnel" API, and the configuration response message is sent from tunneling server 116 in response to the execution of this API.

At 504, tunneling client 106 launches local tunneling proxy 118 for communication to tunneling server 116 by means of the outer layers of tunnel 1 (i.e., outer layers 108) that function as the common transport of all tunnels.

Application 105 then attempts to create a new tunnel 2 by executing "tsc_ctrl_new_tunnel". Internally, tunneling client 107 first connects to the preconfigured local tunneling proxy 118 and then issues, at 505, a tunnel configuration request that is forwarded by local tunneling proxy 118 to tunneling server 116. However, the "tsc_ctrl_new_tunnel" API includes flags (e.g., the "New_Tunnel" TLV disclosed below) to request an already existing network and transport layer (i.e., outer layers 108 established at 502, 503). At 506, tunneling server 116 responds with a tunnel configuration response that is forwarded by local tunneling proxy 118 to tunneling client 107. Note that this behavior relies on the co-transported tunnels feature. Any additional tunnels are created in the same manner as tunnel 2, using the same tunnel 1 outer network and transport layer established at 501.

At 507, all inner traffic and CMs from tunneling client 106 are transmitted inside tunnel 1.

At 508, all inner traffic and CMs from tunneling client 107 in tunnel 2 are transmitted over the transport layer of tunnel 1 (i.e., transport layers 108) via TSCF proxy 118. Proxy 118 receives the traffic from tunneling client 107 and after un-tunneling it, the traffic in re-encapsulated using the already existent tunnel 1 transport layer 108.

Therefore, at 507 and 508, tunnels 1 and 2 (e.g., tunnels 109 and 110 of FIG. 1) share the same transport, in spite of originating from different applications in the same device. Since transport resources at server 116 are limited, embodiments provide an advantage of reduced resources required. Further, for secure transport (i.e. TLS/DTLS tunnels), embodiments also save encryption resources at server 116.

At 509, 510, tunnel 2 is removed by having local tunneling proxy 118 forward the release request and release response to tunneling server 116 and tunneling client 107, respectively. Similarly, at 511, tunnel 1 is removed by sending a release request to tunneling server 116. At 512, tunneling server 116 responds back with a release response.

One embodiment supports a requested tunnel to be negotiated through a tunnel proxy by providing a "New_Tunnel" TLV "flag" that, when present, indicates that a new tunnel is requested on top of the outer network and transport layers that is used to send the tunnel configuration request (e.g., at 504 of FIG. 5).

Table 1 below provides an example of the TSCF New_Tunnel TLV for establishing co-transported tunnels according to an embodiment.

TABLE 1

| TLV TYPE | | | SHORT/ | | |
|---|---|---|---|---|---|
| NAME | VALUE | SEMANTICS | LONG FORMAT | VALUE TYPE | NOTES |
| New_Tunnel | 51 | New Tunnel | Short | Boolean | 0 = Request Existent Tunnel<br>1 = Request New Tunnel |

In one embodiment, the establishment of a second tunnel through a tunnel proxy is requested via tsc_socket APIs using an SDK change that includes the addition of a new mandatory boolean member "enable_tunnel_proxy", and optional address member "tunnel_proxy_address" is added to the "tsc_tunnel_params" structure that is passed to the "tsc_new_tunnel API", as indicated by the following example pseudo-code:

```
typedef struct
{
    ...
    tsc_bool enable_tunnel_proxy;
    tsc_ip_port_address tunnel_proxy_address;
    ...
}tsc_tunnel_params;
``` where tsc_tunnel_params is invoked as:
tsc_handle tsc_new_tunnel (tsc_tunnel_params*tunnel_params, tsc_requested_config*requested_config).
When requesting a tunnel and wanting to enable this feature, enable_tunnel_proxy must be set:
enable_tunnel_proxy=tsc_bool_true;

Once enabled, and if the "tunnel_proxy_address" is not set, localhost (IPv4 address 127.0.0.1) and default TCP port number 2105 are used as tunnel proxy network and transport addresses. If "tunnel_proxy_address" is set, then its IP address and transport port is used instead.

One embodiment that is implemented using an SBC, such as the Acme Packet 6300 from Oracle Corp., to support the tunnel proxy server functionality, provides a keyword "CT" added to the "assigned-services" parameter in the "tscf-interface" configuration object. Table 2 below provides an example of the tscf-interface configuration object according to one embodiment.

TABLE 2

| Parameter Name | Extensible markup language ("XML") tag | Data Type and Default | Value Ranges/Possible Values | Required or Optional (for feature to work)? |
|---|---|---|---|---|
| assigned-services | assigned-services | String: blank | CT to allow incoming co-transported tunnels. | Optional |

The following functionality provides an example interface configuration for providing the tunnel proxy server functionality according to one embodiment:

```
tscf-interface
    realm-id              access
    state                 enabled
    max-tunnels           1000
    local-address-pools   pool
    assigned-services     SIP,CT
    tscf-port
        address           172.168.31.1
        port              2105
        transport-protocol TCP
        tls-profile
        rekey-profile
    last-modified-by      admin@console
    last-modified-date    2015-08-01 07:00:00
```

The following is an example extensible markup language ("XML") functionality for providing the tunnel proxy server functionality according to one embodiment:

```
<tscfInterface realmID='access'
    state='enabled'
    maxTunnels='1000'
    assignedServices='SIP,CT'
    options=''
    lastModifiedBy='admin@console'
    lastModifiedDate='2015-08-01 07:00:00'
    objectId='59'>
    <key>access</key>
    <localAddressPool name='pool'/>
    <tscfPort address='172.168.31.1'
        port='2105'
        transProtocol='TCP'
        tlsProfile=''
        rekeyProfile=''
</tscfInterface>
```

FIG. 6 is a flow diagram of proxy tunneling server module 16 of FIG. 2 and/or tunneling client 106, local tunneling proxy 118 and server concentration 120 of FIG. 1 when providing concentration of independent tunneled traffic using a local tunneling proxy in accordance with embodiments of the present invention. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 602, in response to a first request from first application 104 on UE 102, tunneling client 106 and tunneling server 116 establish a first TSCF tunnel 109. Tunnel 109 can include multiple inner sockets, such as a separate inner socket for speech data, video data, etc. In conjunction with establishing the first tunnel, an associated outer transport and outer network layer is established. Specifically, outer layers 108 include a network layer (outer IP) and a transport layer (outer UDP/DTLS/TCP/TLS).

At 604, in conjunction with creating tunnel 109, tunneling client 106 launches a local tunneling proxy 118.

At 606, a request is received at a second tunneling client 107 from a second application 105 on UE 102 to create a second TSCF tunnel 110. In response to the request, the second tunneling client 107 connects to local tunneling proxy 118 and issues a tunnel configuration request to local tunneling proxy 118.

At 608, the new tunnel creation configuration request is forwarded by local tunneling proxy 118 to tunneling server 116. The request includes a flag to use the outer transport and network layers established at 602 and associated with the first tunnel 109. Therefore, no new outer layers are established when establishing the second TSCF tunnel 110, or any other subsequent tunnels from other applications executing on UE 102.

At 610, in response to the request from application 105 to establish a second TSCF tunnel 110, tunneling client 106 and tunneling server 116 establish a second TSCF tunnel 110.

At 612, all encapsulated inner traffic and CMs that traverse the TSCF tunnels 109, 110 between tunneling client 106 and tunneling server 116 communicate on top of the common outer network and transport layers 108. Traffic from tunneling client 107 and application 105 are forwarded to and from local tunneling proxy 118.

At 614, in response to a request from second application 105, the second created tunnel 110 is removed by having local tunneling proxy 118 forward a release request to tunneling server 116.

At 616, in response to a request from first application 104 on UE 102, the first created tunnel 109 is removed by sending a release request from tunneling client 106 to tunneling server 116. In connection with removing the first created tunnel 109, outer layers 108 are also removed. In one embodiment, transport layer 108 is removed only when both tunnels have been logically removed (i.e., CM releases) regardless of which one is issued first. This is possible because it is the tunneling proxy 118 that controls that transport and is simultaneously aware of the status of both tunnels.

As disclosed, embodiments introduce a local tunneling proxy server 118 that is the first point of contact of any tunneling client 106, 107. When a tunneling client initializes, it verifies connectivity to the corresponding local tunneling proxy server 118 and, if not present, it starts a new one. If present, however, it directly connects to the local tunneling proxy server 118, thus avoiding an expensive connection to tunneling server 116. By concentrating direct connections to tunneling server 116, the utilization of transport and security resources available at the tunneling server is more efficient, allowing for more tunnel clients and thus more users without incurring expensive network topology changes. Therefore, multiple tunnels are created but they all share the same transport for their communication with the outside world. The tunnels can come from different applications residing in the same device.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to transmit encapsulated media, the transmitting comprising:

in response to a first request from a first application to establish a first tunnel, attempt to connect with a local tunneling proxy and when the local tunneling proxy does not exist establishing the first tunnel between a first tunneling client of a user equipment (UE) and a tunneling server and establishing a first outer transport layer and a first outer network layer and establishing the local tunneling proxy, the local tunneling proxy executed by the first tunneling client;

in response to a second request from a second application from a second tunneling client of the UE to establish a second tunnel, attempt to connect with the local tunneling proxy of the first tunneling client and the first tunneling client establishing the second tunnel between the first tunneling client and the tunneling server, wherein the second request comprises a request to use the first outer transport layer and the first outer network layer established in conjunction with the first tunnel and wherein the second request is forwarded to the tunneling server via the local tunneling proxy;

receiving, at the first tunneling client, first encapsulated media to transmit from the first application that uses the first tunnel;

receiving, at the first tunneling client, second encapsulated media to transmit from the second application that uses the second tunnel, the second encapsulated media received from the second application via the second tunneling client; and concentrating, by the local tunneling proxy of the first tunneling client, the received encapsulated media, the concentrating comprising transmitting the first encapsulated media on the first tunnel using the first outer network layer and transmitting the second encapsulated media on the second tunnel using the first outer network layer;

wherein the first application and the second application are each executed on the UE and a single Internet Protocol address is associated with both the first tunnel and the second tunnel.

2. The computer readable medium of claim 1, wherein a second outer transport layer and a second outer network layer is not established in conjunction with establishing the second tunnel.

3. The computer readable medium of claim 1, wherein encapsulated traffic traverses the second tunnel using the first outer transport layer and the first outer network layer, and the encapsulated traffic that traverses the second tunnel is forwarded by the local tunneling proxy, further comprising:

transmitting media traffic between the first application and the tunneling server over the first tunnel using the first outer transport layer; and transmitting media traffic between the second application and the tunneling server over the second tunnel using the first outer transport layer.

4. The computer readable medium of claim 1, wherein the second request includes a request to not establish additional outer transport layers and outer network layers.

5. The computer readable medium of claim 1, wherein the first tunnel and the second tunnel are configured according to a tunneled services control function (TSCF) standard.

6. The computer readable medium of claim 1, wherein the second application is associated with the second tunneling client.

7. The computer readable medium of claim 1, wherein the first application is independent from the second application, and the first tunnel and the second tunnel each comprise multiple inner sockets.

8. A method for transmitting encapsulated media, the method comprising:

in response to a first request from a first application to establish a first tunnel, attempt to connect with a local tunneling proxy and when the local tunneling proxy does not exist establishing the first tunnel between a first tunneling client of a user equipment (UE) and a tunneling server and establishing a first outer transport layer and a first outer network layer and establishing the local tunneling proxy, the local tunneling proxy executed by the first tunneling client;

in response to a second request from a second application from a second tunneling client of the UE to establish a second tunnel, attempt to connect with the local tunneling proxy of the first tunneling client and the first tunneling client establishing the second tunnel between the first tunneling client and the tunneling server, wherein the second request comprises a request to use the first outer transport layer and the first outer network layer established in conjunction with the first tunnel and wherein the second request is forwarded to the tunneling server via the local tunneling proxy;

receiving, at the first tunneling client, first encapsulated media to transmit from the first application that uses the first tunnel;

receiving, at the first tunneling client, second encapsulated media to transmit from the second application that uses the second tunnel, the second encapsulated media received from the second application via the second tunneling client; and concentrating, by the local tunneling proxy of the first tunneling client, the received encapsulated media, the concentrating comprising transmitting the first encapsulated media on the first tunnel using the first outer network layer and transmitting the second encapsulated media on the second tunnel using the first outer network layer;

wherein the first application and the second application are each executed on the UE and a single Internet Protocol address is associated with both the first tunnel and the second tunnel.

9. The method of claim 8, wherein a second outer transport layer and a second outer network layer is not established in conjunction with establishing the second tunnel.

10. The method of claim 8, wherein encapsulated traffic traverses the second tunnel using the first outer transport layer and the first outer network layer, and the encapsulated traffic that traverses the second tunnel is forwarded by the local tunneling proxy, further comprising:

transmitting media traffic between the first application and the tunneling server over the first tunnel using the first outer transport layer; and transmitting media traffic between the second application and the tunneling server over the second tunnel using the first outer transport layer.

11. The method of claim 8, wherein the second request includes a request to not establish additional outer transport layers and outer network layers.

12. The method of claim 8, wherein the first tunnel and the second tunnel are configured according to a tunneled services control function (TSCF) standard.

13. The method of claim 8, wherein the second application is associated with the second tunneling client.

14. The method of claim 8, wherein the first application is independent from the second application, and the first tunnel and the second tunnel each comprise multiple inner sockets.

15. A tunneling client comprising:
a processor; and
a storage device coupled to the processor that stores instructions that cause the processor to establish tunnels, the establishing comprising:
in response to a first request from a first application to establish a first tunnel, attempt to connect with a local tunneling proxy and when the local tunneling proxy does not exist establishing the first tunnel between a first tunneling client of a user equipment (UE) and a tunneling server and establishing a first outer transport layer and a first outer network layer and establishing the local tunneling proxy, the local tunneling proxy executed by the first tunneling client;

in response to a second request from a second application from a second tunneling client of the UE to establish a second tunnel, attempt to connect with the local tunneling proxy of the first tunneling client and the first tunneling client establishing the second tunnel between the first tunneling client and the tunneling server, wherein the second request comprises a request to use the first outer transport layer and the first outer network layer established in conjunction with the first tunnel and wherein the second request is forwarded to the tunneling server via the local tunneling proxy;

receiving, at the first tunneling client, first encapsulated media to transmit from the first application that uses the first tunnel;

receiving, at the first tunneling client, second encapsulated media to transmit from the second application that uses the second tunnel, the second encapsulated media received from the second application via the second tunneling client; and concentrating, by the local tunneling proxy of the first tunneling client, the received encapsulated media, the concentrating comprising transmitting the first encapsulated media on the first tunnel using the first outer network layer and transmitting the second encapsulated media on the second tunnel using the first outer network layer;

wherein the first application and the second application are each executed on the UE and a single Internet Protocol address is associated with both the first tunnel and the second tunnel.

16. The tunneling client of claim 15, wherein a second outer transport layer and a second outer network layer is not established in conjunction with establishing the second tunnel.

17. The tunneling client of claim 15, wherein encapsulated traffic traverses the second tunnel using the first outer transport layer and the first outer network layer, and the encapsulated traffic that traverses the second tunnel is forwarded by the local tunneling proxy, further comprising:

transmitting media traffic between the first application and the tunneling server over the first tunnel using the first outer transport layer; and transmitting media traffic between the second application and the tunneling server over the second tunnel using the first outer transport layer.

18. The tunneling client of claim 15, wherein the second request includes a request to not establish additional outer transport layers and outer network layers.

19. The tunneling client of claim 15, wherein the first tunnel and the second tunnel are configured according to a tunneled services control function (TSCF) standard.

20. The tunneling client of claim 15, wherein the first application is independent from the second application, and the first tunnel and the second tunnel each comprise multiple inner sockets.

* * * * *